United States Patent
Horie et al.

(10) Patent No.: US 12,112,195 B2
(45) Date of Patent: Oct. 8, 2024

(54) CONCURRENT MARKING GARBAGE COLLECTION WITH FINGER POINTER

(71) Applicant: International Business Machines Corporation, Armonk, NY (US)

(72) Inventors: Michihiro Horie, Ageo (JP); Kazunori Ogata, Soka (JP)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 17/002,824

(22) Filed: Aug. 26, 2020

(65) Prior Publication Data

US 2022/0066816 A1    Mar. 3, 2022

(51) Int. Cl.
*G06F 9/46*    (2006.01)
*G06F 9/48*    (2006.01)
*G06F 9/50*    (2006.01)
*G06F 12/02*   (2006.01)

(52) U.S. Cl.
CPC ......... *G06F 9/4881* (2013.01); *G06F 9/5038* (2013.01); *G06F 9/505* (2013.01); *G06F 12/0253* (2013.01); *G06F 12/0269* (2013.01); *G06F 2209/5022* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 6,578,036 B1 | 6/2003 | Lu | |
| 7,293,051 B1* | 11/2007 | Printezis | G06F 12/0269 707/820 |
| 7,640,544 B2 | 12/2009 | Flood et al. | |
| 2003/0005025 A1 | 1/2003 | Shavit | |
| 2006/0143412 A1 | 6/2006 | Armangau | |
| 2010/0223429 A1* | 9/2010 | Cher | G06F 12/0253 711/E12.001 |
| 2012/0236857 A1 | 9/2012 | Manzella | |
| 2013/0152099 A1* | 6/2013 | Bass | G06F 9/5038 718/103 |
| 2017/0344473 A1* | 11/2017 | Gidra | G06F 12/0269 |
| 2019/0361805 A1 | 11/2019 | Horie et al. | |
| 2020/0050484 A1 | 2/2020 | Horie et al. | |

OTHER PUBLICATIONS

Detlef et al; A generational Mostly-concurrent Garbage Collector; ISMM '00, 2000 (Year: 2000).*
Wu et al; Task-pushing: a Scalable Parallel GC Marking Algorithm without Synchronization Operations; IEEE, 2007 (Year: 2007).*

(Continued)

*Primary Examiner* — Bing Zhao
(74) *Attorney, Agent, or Firm* — Edward J. Wixted, III

(57) ABSTRACT

A computer-implemented method, system, and computer program product are provided. The approach includes popping a first task from a queue of a garbage collection thread. The approach also includes identifying a second task from the popped first task, where the second task is associated with a bit of a bitmap and the bit is located at a location within the bitmap that has not yet been passed by a finger pointer. The approach also includes pushing the second task to the queue of the garbage collection thread.

23 Claims, 4 Drawing Sheets

(56) References Cited

OTHER PUBLICATIONS

Detlefs et al., "Garbage-First Garbage Collection", Proceedings of the 4th International Symposium on Memory Management, ISMM 2004, Vancouver, BC, Canada, Oct. 24-25, 2004, 12 pages, <https://www.researchgate.net/publication/221032945_GarbageFirst_garbage_collection>.

Horie et al., "Scaling Up Parallel GC Work-Stealing in Many-Core Environments", Proceedings of the ACM SIGPLAN International Symposium on Memory ManagementJune (ISMM 2019), Jun. 23, 2019, Phoenix, AZ, pp. 27-40, <https://dl.acm.org/doi/10.1145/3315573.3329985>.

\* cited by examiner

CONCURRENT MARKING GARBAGE COLLECTION WITH FINGER POINTER

BACKGROUND

The present invention relates generally to the field of garbage collection, and more particularly to an approach to maintain load balance of work stealing for concurrent marking during garbage collection.

Garbage collection (GC) processes attempt to reclaim garbage, or memory occupied by objects that are no longer in use. GC relieves the programmer from performing manual memory management, where the programmer specifies what objects to deallocate and return to the memory system and when to do so.

Work stealing is a scheduled strategy for multithreaded computer applications. In a work stealing scheduler, each processor in a computer system has a queue of work items (computational tasks, threads) to perform. Each work item consists of a series of instructions, to be executed sequentially, but in the course of its execution, a work item may also create new work items that could feasibly be executed in parallel with other work. When a processor runs out of work, the processor looks at the queues of other processors or threads and steals their work items.

Garbage-First Garbage Collection describes "a server-style garbage collector, targeted for multi-processors with large memories, that meets a soft real-time goal with high probability, while achieving high throughput." (Abstract, Garbage-First Garbage Collection, David Detlefts, et al., ISMM'04, Oct. 24-25, 2004). Garbage-First Garbage Collection describes "a 'finger' pointer [that] iterates over the marked bits. Objects higher than the finger are implicitly gray; gray objects below the finger are represented with a mark stack." (Section 2.5.2, Garbage-First Garbage Collection). As used in Garbage-First Garbage Collection, "gray" means that they objects are "marked but not yet recursively scanned[.]" (Section 2.5.1).

A disadvantage of current garbage collection processes that utilize a finger pointer is that the finger pointer can prevent the pushing of tasks that are below the finger pointer (i.e., associated with bits that are at a location the finger pointer has not yet passed). Load balance can occur when work stealing mechanisms do not have sufficient stealable tasks.

SUMMARY

According to embodiments of the present invention, a computer-implemented method, computer program product, and computer system are provided. The approach includes popping a first popping a first task from a queue of a garbage collection thread. The approach further includes identifying a second task from the popped first task, where the second task is associated with a bit of a bitmap and the bit is located at a location within the bitmap that has not yet been passed by a finger pointer. The approach further includes pushing the second task to the queue of the garbage collection thread. Such an approach has the benefit of preventing load imbalance by adding tasks to a garbage collection queue even if the task is associated with a bit that is located at a location within the bitmap that has not yet been passed by the finger pointer.

According to other embodiments of the present invention, a computer-implemented method, computer program product, and computer system are provided. The approach includes popping a first task from a queue of a garbage collection thread. The approach further includes identifying a second task and a third task from the popped first task, where the second task is associated with a first bit of a bitmap, the first bit is located at a first location within the bitmap that has not yet been passed by a finger pointer, the third task is associated with a second bit of the bitmap, and the second bit is located at a second location within the bitmap that has been passed by the finger pointer. The approach further includes pushing the third task to the queue of the garbage collection thread. The approach further includes determining whether a first number of tasks in the queue of the garbage collection thread is equal to or smaller than a first threshold number of tasks.

Embodiments of the present invention optionally include an approach that determines that a first number of tasks in in the queue of the garbage collection thread is equal to or smaller than a first threshold number of tasks, wherein pushing the second tasks to the queue of the garbage collection thread is responsive to determining that the first number of tasks in the queue of the garbage collection thread is equal to or smaller than the first threshold number of tasks. Such an approach has the benefit of maintaining load balance by pushing tasks to the garbage collection queue when the number of remaining tasks in the garbage collection queue are small.

Embodiments of the present invention may optionally also include an approach that calculates a difference between (i) the first number of tasks in the queue of the garbage collection thread subsequent to popping the first task and (ii) a second number of tasks in the queue of the garbage collection thread subsequent to popping a task before popping the first task. The approach may also optionally determine that the difference meets or exceeds a second threshold number of tasks. The approach may also, responsive to the difference meeting or exceeding the second threshold number of tasks, increase the first threshold number of tasks. Such an approach has the benefit of adjusting the threshold based on the load-balance of work stealing by GC threads.

DETAILED DESCRIPTION

Embodiments of the present invention recognize that, in garbage-first garbage collection (G1GC) and other concurrent garbage collection (GC) approaches that utilize a finger pointer, load imbalance may occur due to the finger pointer limiting pushable tasks for work stealing. Embodiments of the present invention disclose an approach to provide enough tasks that are able to be stolen by a thread, even when the finger pointer limits pushable tasks. Embodiments of the present invention disclose an approach where a worker thread pushes a child task to the worker thread's queue even if the child task is located below a finger pointer (i.e., at a location the finger pointer has not yet passed) when the number of remaining tasks is below a threshold number of tasks. Embodiments of the present invention further provide for automatically tuning the threshold based on task reduction per unit time in order to maintain load balancing through the GC process.

Figure 1:
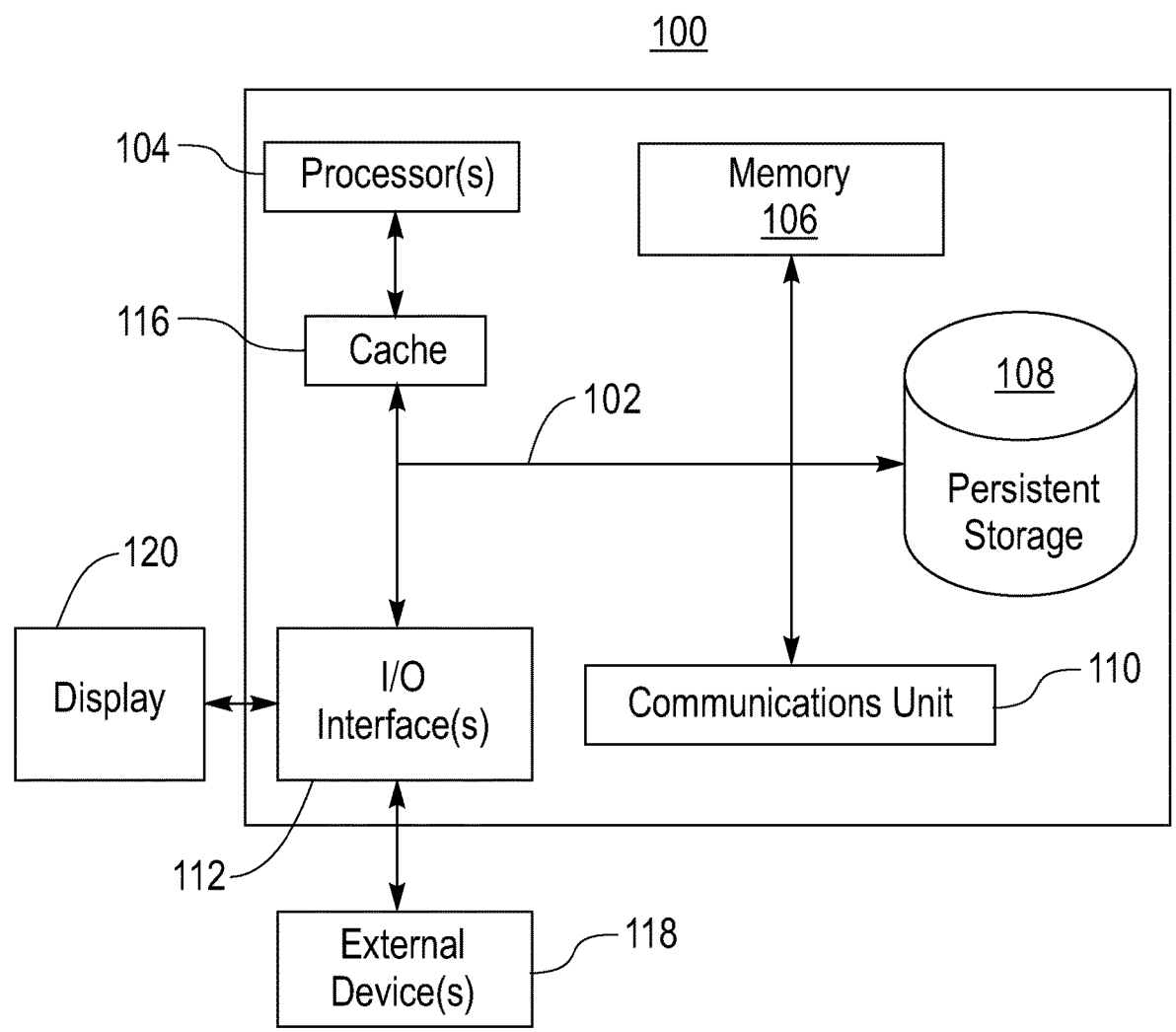
FIG. 1 is a functional block diagram illustrating a processing system, in accordance with an embodiment of the present invention.

The present invention will now be described in detail with reference to the Figures. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 includes communications fabric 102, which provides communications between cache 116, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of computer processor(s) 104 by holding recently accessed data, and data near accessed data, from memory 106.

Programs, applications, and/or other data may be stored in persistent storage 108 and in memory 406 for execution and/or access by one or more of the respective computer processors 104 via cache 116. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs, applications, and/or other data may be downloaded to persistent storage 108 through communications unit 110.

I/O interface(s) 112 allows for input and output of data with other devices that may be connected to computing device 100. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 2:
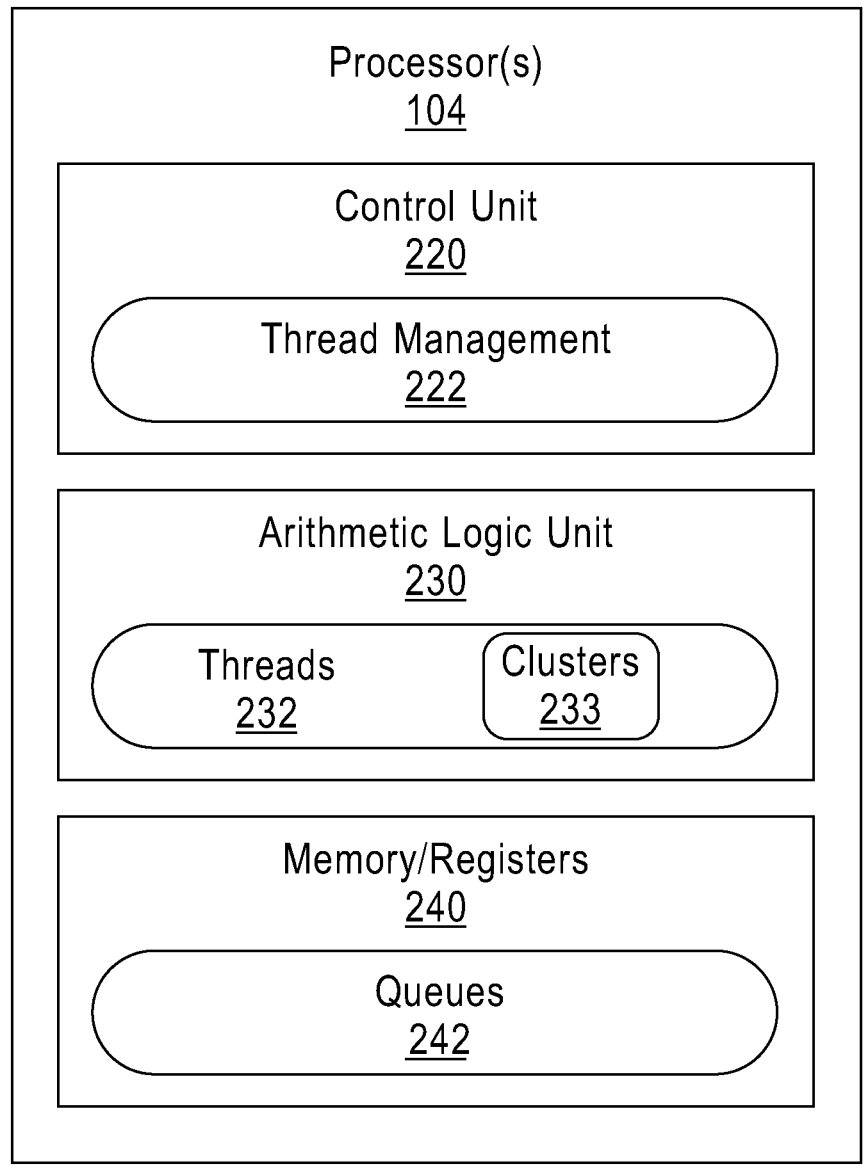
FIG. 2 is a block diagram showing a processor device, in accordance with an embodiment of the present invention.

FIG. 2 depicts processor(s) 104, as depicted in FIG. 1, in accordance with an embodiment of the present invention. Processor(s) 104 can be, for example, a graphics processing unit (GPU), an application-specific instruction set processor (ASIP), a virtual processor (vCPU), a digital signal processor (DSP), an image processor, a physics processing unit (PPU), or a central processing unit for a computer, server, tablet, internet-connected-device, or phone.

In one embodiment, processor(s) 104 can include control unit 220, arithmetic logic unit 230, and memory/register 240. Control unit 220 of processor(s) 104 controls processor(s) 104 and what instructions are processed by processor(s) 104. Control unit 220 can include thread management process 222. Thread management process 222 can include rules for handling memory/registers 240, cache 116, memory 106, or persistent storage 108 that is occupied by objects that are no longer in use by any threads 232. Thread management process 222 can manage threads 232 and any memory locations utilized by threads 232 (e.g., memory/registers 240, cache 116, memory 106, persistent storage 108). Management of threads 232 can include grouping threads 232 together to form thread clusters 233. Thread clusters 233 can be employed to accomplish larger processes together.

Arithmetic logic unit 230 can include threads 232. Threads 32 can process the tasks that are run on processor(s) 104. Threads 232 can be grouped into thread clusters 233 by thread management process 222 or by arithmetic logic unit 230. Threads 232 or thread clusters 233 can pop a task from memory (e.g., memory/registers 240) and process the task by copying an object from the task and modifying the object's reference. After processing the task, threads 232 or thread clusters 233 create child tasks from the processed task by following the references of the copied object. Threads 232 or thread clusters 233 push the child tasks created into memory (e.g., memory/registers 240). Threads 232 or thread clusters 233 pop the next task for processing after pushing all the child tasks created into memory (e.g., memory/registers 240).

Memory/registers 240 can include different sections including queues 242. Queues 242 can be divided into different sections that can be accessed by different threads 232 or thread clusters 233.

The term object refers to a data structure represented in a computer system's memory. Other terms sometimes used for the same concept are record and structure. An object may be identified by a reference, a relatively small amount of information that can be used to access the object. A reference can be represented as, for example, a pointer or a machine address.

Programs run on systems, such as computing device 100, using many processor(s) 104 and dynamically generate objects that are stored in a part of memory referred to as the heap. The heap is a shared memory managed by automatic garbage collection. A garbage collector has control of and/or direct access and/or knowledge of the addresses, classes, roots, and other such detailed information about objects created in computing device 100.

After an object is no longer needed, it sometimes becomes necessary to reclaim the memory (e.g., memory/registers 240, cache 116, memory 106, persistent storage 108) allocated to the object in order to prevent the system from running out of memory as more and more temporary objects fill the heap. Such memory reclaiming is referred to as garbage collection (GC).

Garbage collectors operate by reclaiming space that is no longer reachable. Statically allocated objects represented by a program's global variables are normally considered reachable throughout a program's life. Such objects are not ordinarily stored on the GC's managed memory space, but may contain references to dynamically allocated objects that are stored in the GC's managed memory space, and such dynamically allocated objects are also considered reachable. Objects referred to in an execution thread's call stack are reachable, as are objects referred to by register contents. Further, an object referred to by any reachable object is also reachable.

The use of automatic garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use by that sequence of code, but it is considerably more difficult for them to know what the rest of the application is doing with that memory. By tracing references from some notion of a root set (e.g., global variables, registers, and the call stack), automatic garbage collectors obtain global knowledge in a methodical way. By using a garbage collector, the programmer is relieved of the need to worry about the application's global state and can concentrate on local-state issues, which are more manageable.

An object is considered reachable if the object is referred to by a reference in a root. The root set includes, for example, reference values stored in a mutator's threads' call stacks, memory/registers 240, and global variables outside the garbage-collected heap. An object is also reachable if the object is referred to by another reachable object. Objects that are not reachable can no longer affect the program, so it is safe to re-allocate the memory spaces that these objects occupy.

One approach to garbage collection is to identify all reachable objects and reclaim any previously allocated memory that the reachable objects do not occupy. A GC may identify reachable objects by tracing objects pointed to from a root, tracing objects pointed to from those reachable objects, and so on until all the referenced or pointed to objects are found and are retained. Thus, the last objects found will have no pointers to other untraced objects. In this way, unreachable objects are in effect discarded and the associated memory space becomes free for alternate use.

Figure 3:
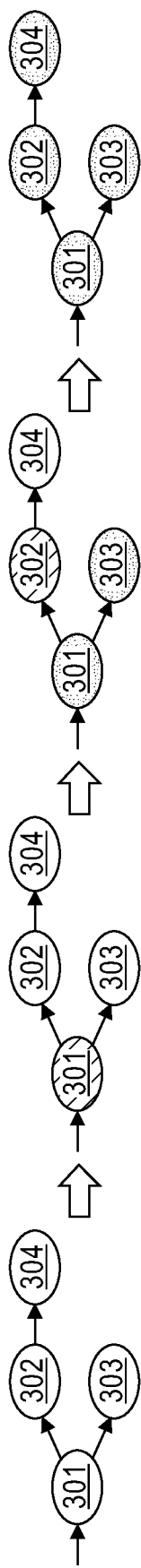
FIG. 3 is an example set of objects, including reference relationship and marking status, in accordance with an embodiment of the present invention.

FIG. 3 depicts an example of objects reachable by a concurrent garbage collection process, such as G1GC, and the types of objects that are identified as a marking process occurs. The depicted example shows the marking process over a period of time. During the garbage collection process, there are three categories of objects: (i) objects that have not yet been marked (see objects 301-304, without shading); (ii) objects that have been marked, but their direct children (i.e., reference objects) have not been marked (see objects 301 and 302, shaded with first pattern); and (iii) objects that have been marked and their direct children have also been marked (see objects 301-304, shaded with second pattern).

In the example, initially, none of objects 301-304 are marked, and this is depicted in FIG. 3 by the initial lack of shading of any of objects 301-304.

An initial operation of concurrent marking for a garbage collector, such as G1GC, is root scanning. Root scanning requires stop-the-world. Stop-the-world garbage collectors completely halt execution of the program to run a collection cycle, thus guaranteeing that new objects are not allocated and objects do not suddenly become unreachable while the collector is running. Concurrent garbage collectors, such as G1GC generally do not stop program execution, except briefly when the program's execution stack is scanned. More particularly, in the current example, to shorten the stop-the-world pause, GC threads (e.g., threads 232) set bits for root objects in a bitmap. However, because pushing root objects, such as root object 301 into GC threads can be slow, G1GC avoids pushing root objects during the root scanning phase. In the example depicted in FIG. 3, a GC thread (e.g., a thread of threads 232) sets a bit for root object 301 in a bitmap during the root scanning. As described above, this bit represents that root object 301 has been marked, but the direct children of root object 301 (i.e., reference objects) have not been marked. Objects 302 and 303 are the direct children of root object 301. As depicted, reference object 301 is shaded with a first pattern while objects 302-304 remain unshaded.

Subsequently, during a marking phase, GC threads (e.g., threads 232) identify a marked bit in the bitmap and find the corresponding object from the marked bit. In the example of FIG. 3, the marked bit (not shown) corresponds to object 301 when shaded with the first pattern. When a GC thread finds such an object, the GC thread scans the reference objects and sets corresponding bits in the bitmap. In the depicted example, the net result of this operation is that object 301 is shaded with the second pattern to indicate that object 301 has been marked and the direct children of object 301 are also marked. In addition, objects 302 and 303 are marked in the bitmap. As depicted in FIG. 3, object 302 has unmarked children and is shaded with the first pattern, while object 303 does not have unmarked children and is shaded with the second pattern. Accordingly, embodiments of the present invention recognize that the two processes (i.e., the root scanning phase and the marking phase) can result in two meanings of a bit in one bitmap. The two possible meanings of a marked bit are: (i) object is marked but the object's direct children are not yet marked (corresponding to the first pattern, see above); and (ii) object is marked and the object's direct children are also marked (Corresponding to the second pattern, see above).

As described in further detail with reference to FIG. 4 (see below), G1GC uses a finger pointer is used to distinguish between the two possible meanings of a marked bit on the bitmap. As the marking phase continues, eventually, all objects and their direct children will be scanned and marked and the marking phase is complete. As depicted in the example of FIG. 3, upon completion of the marking phase, all objects are shaded with the second pattern, indicating that each object and each object's direct children have been marked.

Figure 4:
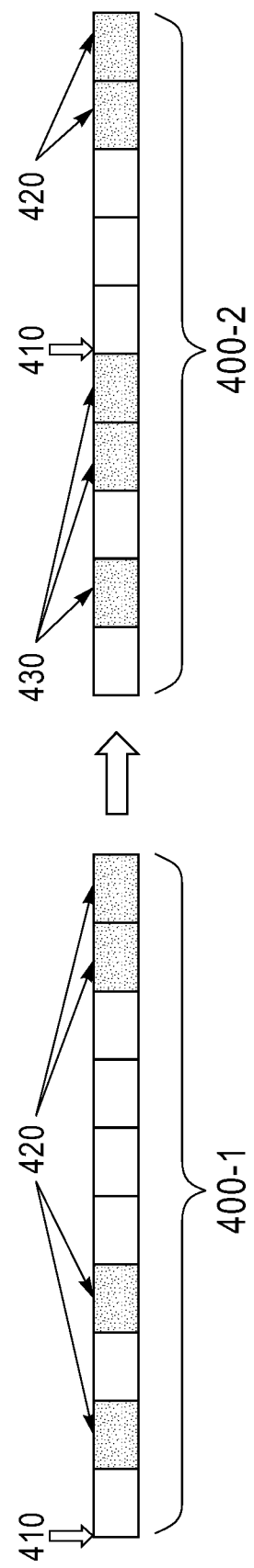
FIG. 4 is an example bitmap that includes a finger pointer, in accordance with an embodiment of the present invention.

FIG. 4 depicts an example bitmap 400, similar to the bitmap described with reference to FIG. 3. Bitmap 400 is depicted at two instances of time. First, bitmap 400-1 is a depiction of bitmap 400 after initial marking phase performed by G1GC during the root scanning process, as previously described. Each of each of the marked bits 420 correspond to a root object. Accordingly, during the marking phase, G1GC will check each marked bit and find the corresponding object, scan the reference objects, and set any additional corresponding bits in the bitmap, as previously described with reference to FIG. 3. Finger pointer 410 is used to distinguish between the two meanings of a bit, as described in reference to FIG. 3. Finger pointer 410 iterates over the marked bits, moving from one end of the bitmap 400 (e.g., the beginning) to the other end of bitmap 400 (e.g., the end). In the depicted example, finger pointer moves from left to right. As depicted, finger pointer 410 is at the beginning of bitmap 400-1 and, over time, travels towards the right, as depicted in bitmap 400-2. Marked bits that are below finger pointer 410 (e.g., to the right of finger pointer 410, as finger pointer 410 is traveling right in the depicted example) are bits that still require a GC thread (e.g., thread 232) to check the bit during the marking phase. Marked bits that are below finger pointer 410 such as marked bits 420 correspond to objects that have been marked but direct children of the objects have not yet been marked (see objects shaded with first shading of FIG. 3). In general, marked bits that are above the finger pointer (i.e., at a location that has already been passed by finger pointer 410) such as marked bits 430 correspond to objects that: (i) have been marked and (ii) their direct children have been marked. However, during the marking phase, it is possible for a GC thread (e.g., thread 232) to identify a reference object that corresponds to a bit of bitmap (e.g., bitmap 400) that is located above the finger pointer (e.g., finger pointer 410) and corresponds to an object that has been marked but direct children of the object have not been marked. How a GC thread (e.g., thread 232) handles such a situation during the marking phase will be described below with reference to FIG. 5. Once a marked bit, such as one of marked bits 420 is picked up by a GC thread (e.g., thread 232), finger pointer 410 is moved to a position before the next marked bit. For example, a GC thread may move finger pointer 410 to a position before the next marked bit. Once finger pointer 410 moves to the end of the bitmap, the marking phase is complete.

Figure 5:
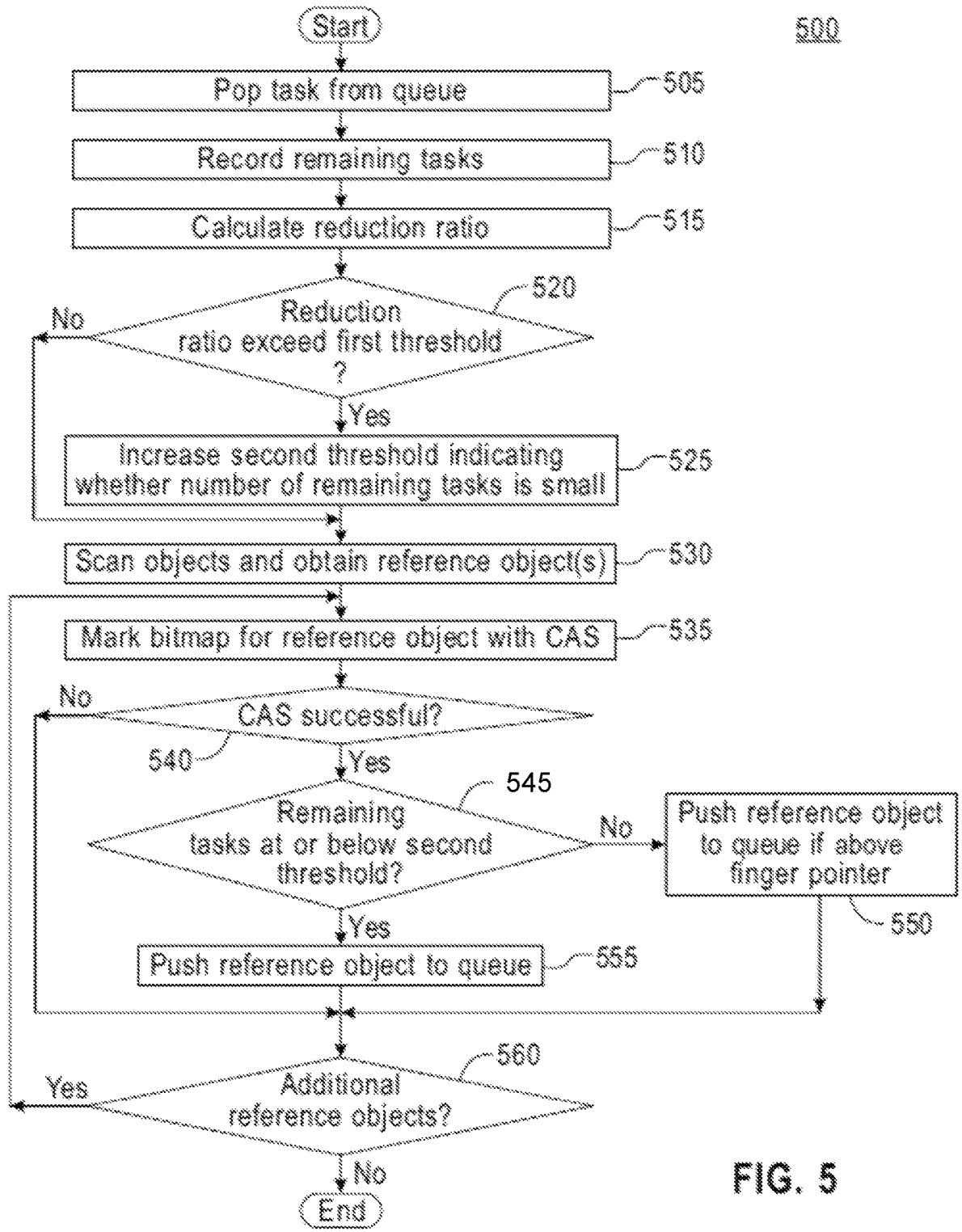
FIG. 5 is a flowchart depicting operational steps of an approach for adding reference object(s) to a queue of a garbage collector thread, in accordance with an embodiment of the present invention.

FIG. 5 depicts a flowchart 500 depicting operations of a first GC thread, such as thread 232, operating within the garbage collector described herein. More particularly, flowchart 500 is describing operations performed by the first GC thread during an iteration of the marking phase of a G1 type garbage collector. Upon completion of the operations described in flowchart 500, the operations are performed again until no tasks remain in the first GC thread's queue. The current flowchart description corresponds to an individual GC thread of threads 232, described herein as the first GC thread. However, a plurality of GC threads, such as threads 232, may be concurrently performing the operations described herein. Each of threads 232 own a queue and process tasks on top of a work stealing mechanism. When an individual thread 232 becomes empty, the individual thread 232 attempts to steal tasks from other thread queues. Embodiments of the present invention describe an approach that allows work stealing to cooperate with finger pointer 410 and prevent load imbalance by allowing a thief thread to have enough stealable tasks.

A first GC thread pops a task from the first GC thread's queue (505). The popped task corresponds to an object that has been marked in bitmap 400 and that object is to be scanned (see 530).

The first GC thread records the remaining tasks (510). More particularly, the first GC thread records the tasks that remain in the queue of the first GC thread after the task is popped (see 505).

The first GC thread calculates the difference from the previous remaining number of tasks (i.e., the remaining number of tasks when the previous task was popped in the prior iteration) and records the difference as a reduction ratio (515). The reduction ratio is a number of decreased tasks per unit time. The reduction ratio indicates the frequency at which other GC threads are stealing tasks from the first GC thread according to the work stealing mechanisms of the garbage collection process. A small reduction ratio indicates little to no work stealing, while a large reduction ratio would indicate that work stealing is occurring more frequently.

The first GC thread determines whether the reduction ratio meets or exceeds a first threshold number (520). The first threshold is a predefined parameter that can be changed. For example, the first threshold may be eight. In such an example, the first GC thread would determine that the reduction ratio meets or exceeds the first threshold if the calculated reduction ration (see 515) was eight or more tasks. An administrative user may set the first threshold based on hardware, software, and/or workload requirements of computing device 100. In general, a variety of factors may be considered when setting the first threshold such as, for example, CPU type, type of workloads typically running on a system.

If the first GC thread determines that the reduction ratio is less than the first threshold number (520, no branch), the first GC thread scans the popped object and obtains existing reference objects (see 530).

If the first GC thread determines that the reduction ratio meets or exceeds the first threshold number (520, yes branch), the first GC thread increases a second threshold number (525). The second threshold number is also a predefined parameter that can be changed. For example, an initial value of the second threshold number may be two. An administrative user may set the initial value of the second threshold number. The second threshold number represents whether the number of remaining tasks in the queue of the first GC thread is to be considered small. If the number of remaining tasks in the queue of the first GC thread is at or below the second threshold, the number of remaining tasks in the queue of the first GC thread is considered to be small for purposes of an embodiment of the present invention. If the number of remaining tasks in the queue of the first GC thread is greater than the second threshold, then the number of remaining tasks in the queue of the first GC thread is not considered to be small. The amount by which the first GC thread increases the second threshold may be a predetermined number. For example, at each iteration, the first GC thread may increase the second threshold by one after determining that the reduction ratio meets or exceeds the first threshold number (520, yes branch).

The first GC thread scans the popped object and obtains any existing reference objects (530). Each identified reference object creates a child task from the processed task of scanning the popped object by following the references of the popped object. As described previously with reference to FIGS. 3-4, during the marking phase, GC threads scan objects that have been marked in bitmap 400 and identify reference objects. For example, if the first GC thread were to scan object 302 of FIG. 3, the first GC thread would obtain reference object 304. If the first GC thread scans the popped object and identifies no existing reference objects, the iteration is complete and the first GC thread will pop another task or, if the queue is empty, attempt to steal a task from another GC thread. Assuming the first GC thread identifies at least one reference object from the popped object, the first GC thread proceeds to operation 535.

The first GC thread marks bitmap 400 for a first reference object identified from the scanned popped object (535) using compare-and-swap (CAS). CAS is an atomic instruction used in multithreading to achieve synchronization. CAS compares the contents of a memory location with a given value and, only if they are the same, modifies the contents of that memory location to a new given value. CAS is done as a single atomic operation that guarantees that the new value is calculated based on up-to-date information. If another thread had updated the value in the meantime, the write would fail. The result of the operation must indicate whether the operation performed the substitution, which can be done either with a Boolean response or by returning the value read from the memory location. The identified first reference object may corresponding to a bit located either above or below the location of finger pointer 410 on bitmap 400.

The first GC thread determines whether the CAS was successful (540). The first GC thread determines whether the CAS was successful based on whether write attempt to the bitmap, to generate the marked bit corresponding to the first reference object, succeeded or failed. If the write attempt was successful, the CAS was successful. If the write attempt failed, the CAS was unsuccessful.

If the first GC thread determines that the CAS was unsuccessful (540, no branch), the first GC thread determines whether there are any additional reference objects (see 560).

If the first GC thread determines that the CAS was successful (540, yes branch), the first GC thread determines whether the number of remaining tasks is at or below the second threshold (545). The first GC thread previously recorded the remaining tasks (see 510). Accordingly, the first GC is able to determine whether the number of remaining tasks is at or below the second threshold by comparing the recorded number of remaining tasks to the second threshold.

If the number of remaining tasks is above the second threshold (545, no branch), the first GC thread pushes the reference object task to the first GC thread's queue if the reference object corresponds to a marked bit of bitmap 400 that is above the finger pointer (i.e., at a location in the path that the finger pointer is traveling away from, and, accordingly, has already passed) (550). If the reference object corresponds to a marked bit that is below finger pointer 410 (i.e., at a location in the path that the finger pointer is moving towards, but has not yet passed), the first GC thread will not push the reference object task to the first GC thread's queue when the number of remaining tasks is above the second threshold If the number of remaining tasks is at or below the second threshold, (545, yes branch), the first GC thread pushes the reference object task to the first GC thread's queue (555). When the number of remaining tasks is at or below the second threshold, the first GC thread pushes the reference object task regardless of the location of a corresponding marked bit within bitmap 400. When the number of remaining tasks is at or below the second threshold, the first GC thread will push the reference object to the first GC's thread if the marked bit is located above or below finger pointer 410.

The first GC thread determines whether there remain additional reference objects that were identified during the scan (560).

If the first GC thread determines that there are additional reference objects (560, yes branch), the first GC thread attempts to mark bitmap 400 for one of the additional reference objects (see 535).

If the first GC thread determines that there are no more additional reference objects, the iteration is complete. A subsequent iteration will occur if there remain tasks in the first GC thread's queue. If no more tasks are in the first GC thread's queue, the first GC thread may attempt to steal a task from another GC thread.

Embodiments of the present invention recognize that the described approach may allow for the presence of an increased number of stealable tasks which can help with load imbalance issues. Embodiments of the present invention further recognize that, while pushing tasks that are located below the finger pointer, as described herein, may result in the occurrence of additional scans for those pushed tasks, such an approach takes advantage of load balancing by paying the smaller overhead of additional scanning. In contrast with other approaches to load balancing, the small overhead of potential additional scanning does not require any additional memory fences or CAS. Further, there is no additional overhead in checking the remaining tasks in the GC thread queue because the GC thread originally counts the remaining tasks whenever the GC thread pops a task.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    popping a first task from a queue of a garbage collection thread;
    iterating a finger pointer over a bitmap, wherein:
    the first task corresponds to a first bit at a first location that has been marked in the bitmap;
    locations not yet passed by the finger pointer correspond to tasks which have been marked but direct children have not yet been marked; and
    locations that have been passed by the finger pointer correspond to tasks which have been marked and direct children have been marked;
    identifying a reference object by scanning the first task;
    responsive to identifying the reference object, creating a second task from the popped first task, wherein:
    creating the second task comprises marking a second bit of the bitmap;
    the second task is associated with the second bit of the bitmap; and
    the second bit is located at a second location within the bitmap that has not yet been passed by the finger pointer; and
    responsive to identifying the bit at the second location within the bitmap that has not yet been passed by the finger pointer, pushing the second task to the queue of the garbage collection thread.

2. The computer-implemented method of claim 1, further comprising:

determining that a first number of tasks in the queue of the garbage collection thread is equal to or smaller than a first threshold number of tasks; and wherein pushing the second task to the queue of the garbage collection thread is responsive to determining that the first number of tasks in the queue of the garbage collection thread is equal to or smaller than the first threshold number of tasks.

3. The computer-implemented method of claim 2, further comprising:

calculating a difference between (i) the first number of tasks in the queue of the garbage collection thread subsequent to popping the first task and (ii) a second number of tasks in the queue of the garbage collection thread subsequent to popping a task before popping the first task;

determining that the difference meets or exceeds a second threshold number of tasks; and responsive to the difference meeting or exceeding the second threshold number of tasks, increasing the first threshold number of tasks.

4. The computer-implemented method of claim 1, wherein the first task is associated with a first object and the second task is associated with a second object via a reference to the second object within the first object.

5. The computer-implemented method of claim 1, further comprising:

marking the bit of the bitmap based on the identification of the second task from the popped first task.

6. The computer-implemented method of claim 1, wherein the garbage collection thread is of a plurality of garbage collection threads operating concurrently.

7. The computer-implemented method of claim 1, wherein the garbage collection thread is of a garbage-first garbage collector (G1GC).

8. A computer-implemented method comprising:

popping a first task from a queue of a garbage collection thread;

iterating a finger pointer over a bitmap, wherein:

the first task corresponds to a first bit at a first location that has been marked in the bitmap;

locations not yet passed by the finger pointer correspond to tasks which have been marked but direct children have not yet been marked; and locations that have been passed by the finger pointer correspond to tasks which have been marked and direct children have been marked;

identifying a reference object by scanning the first task;

responsive to identifying the reference object, creating a second task and a third task from the popped first task;

marking a second bit of the bitmap for the second task and a third bit of the bitmap for the third task, wherein:

the second task is associated with the second bit of the bitmap;

the second bit is located at a second location within the bitmap that has not yet been passed by the finger pointer;

the third task is associated with the third bit of the bitmap; and the third bit is located at a third location within the bitmap that has been passed by the finger pointer;

pushing the third task to the queue of the garbage collection thread;

determining that a first number of tasks in the queue of the garbage collection thread is equal to or smaller than a first threshold number of tasks; and responsive to determining that the first number of tasks in the queue of the garbage collection thread is equal to or smaller than the first threshold number of tasks, pushing the second task to the queue of the garbage collection thread.

9. A computer program product comprising:

one or more computer readable storage media, and program instructions collectively stored on the one or more computer readable storage media, the program instructions comprising:

program instructions to pop a first task from a queue of a garbage collection thread;

program instructions to iterate a finger pointer over a bitmap, wherein:

the first task corresponds to a first bit at a first location that has been marked in the bitmap;

locations not yet passed by the finger pointer correspond to tasks which have been marked but direct children have not yet been marked; and locations that have been passed by the finger pointer correspond to tasks which have been marked and direct children have been marked;

program instructions to identify a reference object by scanning the first task;

program instructions, responsive to identifying the reference object, to create a second task from the popped first task, wherein:

program instructions to create the second task comprise program instructions to mark a second bit of the bitmap;

the second task is associated with the second bit of the bitmap; and the second bit is located at a second location within the bitmap that has not yet been passed by the finger pointer; and program instructions to, responsive to identifying the bit at the second location within the bitmap that has not yet been passed by the finger pointer, push the second task to the queue of the garbage collection thread.

10. The computer program product of claim 9, further comprising:

program instructions, collectively stored on the one or more computer readable storage media, to determine that a first number of tasks in the queue of the garbage collection thread is equal to or smaller than a first threshold number of tasks; and wherein program instructions to push the second task to the queue of the garbage collection thread is responsive to determining that the first number of tasks in the queue of the garbage collection thread is equal to or smaller than the first threshold number of tasks.

11. The computer program product of claim 10, further comprising:

program instructions, collectively stored on the one or more computer readable storage media, to calculate a difference between (i) the first number of tasks in the queue of the garbage collection thread subsequent to popping the first task and (ii) a second number of tasks in the queue of the garbage collection thread subsequent to popping a task before popping the first task;

program instructions, collectively stored on the one or more computer readable storage media, to determine that the difference meets or exceeds a second threshold number of tasks; and program instructions, collectively stored on the one or more computer readable storage media, to, responsive to the difference meeting or exceeding the second threshold number of tasks, increase the first threshold number of tasks.

12. The computer program product of claim 9, wherein the first task is associated with a first object and the second task is associated with a second object via a reference to the second object within the first object.

13. The computer program product of claim 9, further comprising:
program instructions, collectively stored on the one or more computer readable storage media, to mark the bit of the bitmap based on the identification of the second task from the popped first task.

14. The computer program product of claim 9, wherein the garbage collection thread is of a plurality of garbage collection threads operating concurrently.

15. The computer program product of claim 9, wherein the garbage collection thread is of a garbage-first garbage collector (G1GC).

16. A computer program product comprising:
one or more computer readable storage media, and program instructions collectively stored on the one or more computer readable storage media, the program instructions comprising:
program instructions to pop a first task from a queue of a garbage collection thread;
program instructions to iterate a finger pointer over a bitmap, wherein:
the first task corresponds to a first bit at a first location that has been marked in the bitmap;
locations not yet passed by the finger pointer correspond to tasks which have been marked but direct children have not yet been marked; and
locations that have been passed by the finger pointer correspond to tasks which have been marked and direct children have been marked;
program instructions to identify a reference object by scanning the first task;
program instructions, responsive to identifying the reference object, create a second task and a third task from the popped first task by scanning the first task for reference objects;
program instructions to mark a second bit of the bitmap for the second task and a third bit of the bitmap for the third task, wherein:
the second task is associated with the second bit of the bitmap;
the second bit is located at a second location within the bitmap that has not yet been passed by the finger pointer;
the third task is associated with the third bit of the bitmap; and
the third bit is located at a third location within the bitmap that has been passed by the finger pointer;
program instructions to push the third task to the queue of the garbage collection thread;
program instructions to determine that a first number of tasks in the queue of the garbage collection thread is equal to or smaller than a first threshold number of tasks; and
program instructions to, responsive to determining that the first number of tasks in the queue of the garbage collection thread is equal to or smaller than the first threshold number of tasks, push the second task to the queue of the garbage collection thread.

17. A computer system comprising:
one or more computer processors, including one or more threads, one or more computer readable storage media, and program instructions collectively stored on the one or more computer readable storage media for execution by at least one of the one or more computer processors, the program instructions comprising:
program instructions to pop a first task from a queue of a garbage collection thread;
program instructions to iterate a finger pointer over a bitmap, wherein:
the first task corresponds to a first bit at a first location that has been marked in the bitmap;
locations not yet passed by the finger pointer correspond to tasks which have been marked but direct children have not yet been marked; and
locations that have been passed by the finger pointer correspond to tasks which have been marked and direct children have been marked;
program instructions to identify a reference object by scanning the first task;
program instructions, responsive to identifying the reference object, to create a second task from the popped first task, wherein:
program instructions to create the second task comprise program instructions to mark a second bit of the bitmap;
the second task is associated with the second bit of the bitmap; and
the second bit is located at a second location within the bitmap that has not yet been passed by the finger pointer; and
program instructions to, responsive to identifying the bit at the second location within the bitmap that has not yet been passed by the finger pointer, push the second task to the queue of the garbage collection thread.

18. The computer system of claim 17, further comprising:
program instructions, collectively stored on the one or more computer readable storage media for execution by at least one of the one or more computer processors, to determine that a first number of tasks in the queue of the garbage collection thread is equal to or smaller than a first threshold number of tasks; and
wherein program instructions to push the second task to the queue of the garbage collection thread is responsive to determining that the first number of tasks in the queue of the garbage collection thread is equal to or smaller than the first threshold number of tasks.

19. The computer system of claim 18, further comprising:
program instructions, collectively stored on the one or more computer readable storage media for execution by at least one of the one or more computer processors, to calculate a difference between (i) the first number of tasks in the queue of the garbage collection thread subsequent to popping the first task and (ii) a second number of tasks in the queue of the garbage collection thread subsequent to popping a task before popping the first task;
program instructions, collectively stored on the one or more computer readable storage media for execution by at least one of the one or more computer processors, to determine that the difference meets or exceeds a second threshold number of tasks; and
program instructions, collectively stored on the one or more computer readable storage media for execution by at least one of the one or more computer processors, to, responsive to the difference meeting or exceeding the second threshold number of tasks, increase the first threshold number of tasks.

20. The computer system of claim 17, wherein the first task is associated with a first object and the second task is associated with a second object via a reference to the second object within the first object.

21. The computer system of claim 17, further comprising:
program instructions, collectively stored on the one or more computer readable storage media for execution by at least one of the one or more computer processors, to mark the bit of the bitmap based on the identification of the second task from the popped first task.

22. The computer system of claim 17, wherein the garbage collection thread is of a plurality of garbage collection threads operating concurrently.

23. The computer system of claim 17, wherein the garbage collection thread is of a garbage-first garbage collector (G1GC).

\* \* \* \* \*